April 24, 1962    F. ERDELYI    3,031,553
AUTOMATICALLY CONTROLLED ROLLING MILL FOR
THE PRODUCTION OF CUTTING TOOLS
WITH ROTARY WORKING MOVEMENT
Filed May 22, 1957    5 Sheets-Sheet 1
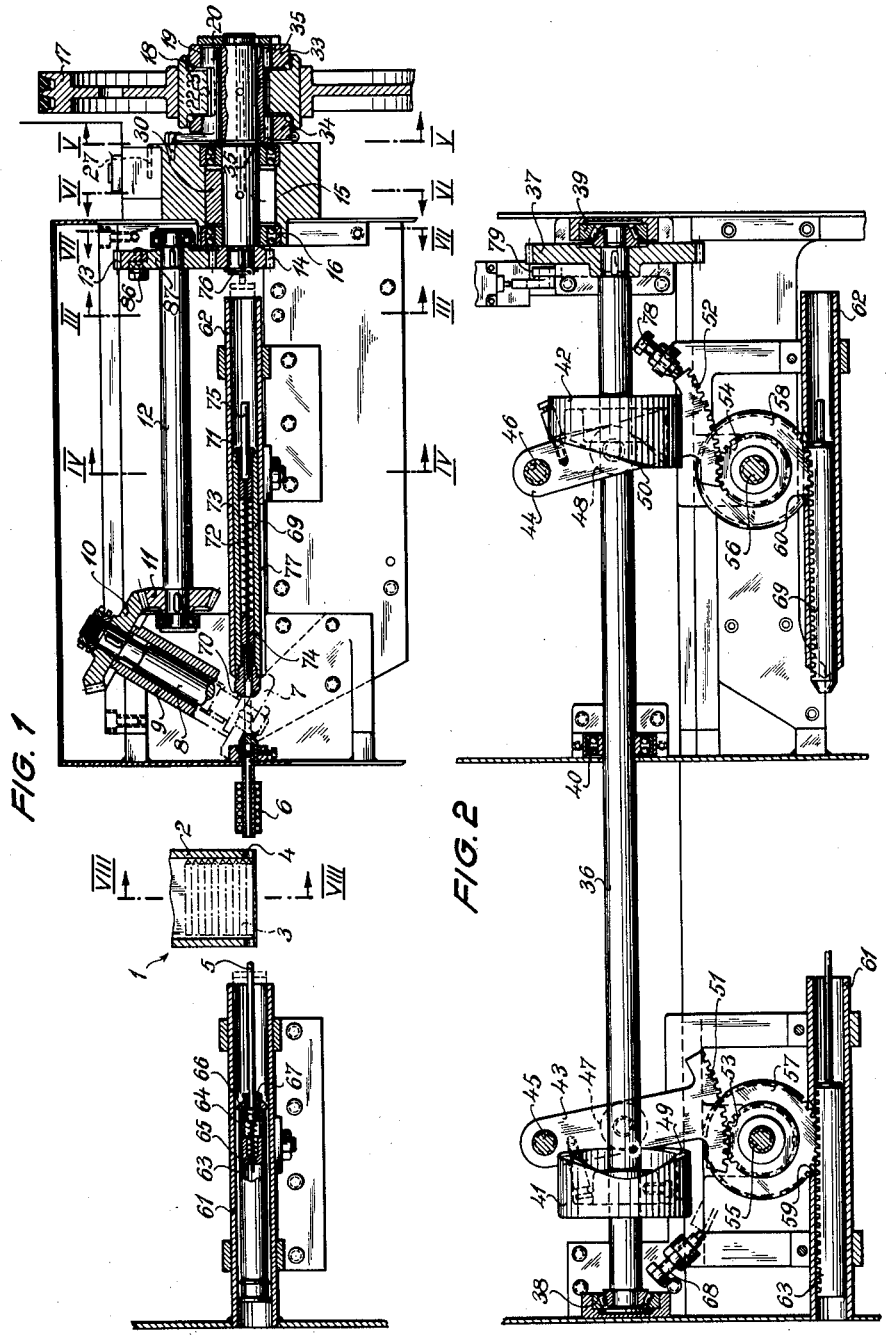
INVENTOR
Ferenc Erdelyi
by Tournier & Beaman
Attorney April 24, 1962

F. ERDELYI 3,031,553

AUTOMATICALLY CONTROLLED ROLLING MILL FOR
THE PRODUCTION OF CUTTING TOOLS
WITH ROTARY WORKING MOVEMENT

Filed May 22, 1957

INVENTOR
Ferenc Erdelyi
by Sommer F. Beaman
Attorney

April 24, 1962

F. ERDELYI 3,031,553

AUTOMATICALLY CONTROLLED ROLLING MILL FOR
THE PRODUCTION OF CUTTING TOOLS
WITH ROTARY WORKING MOVEMENT

Filed May 22, 1957

INVENTOR
Ferenc Erdélyi
by Lounsam O'Beaman
Attorney

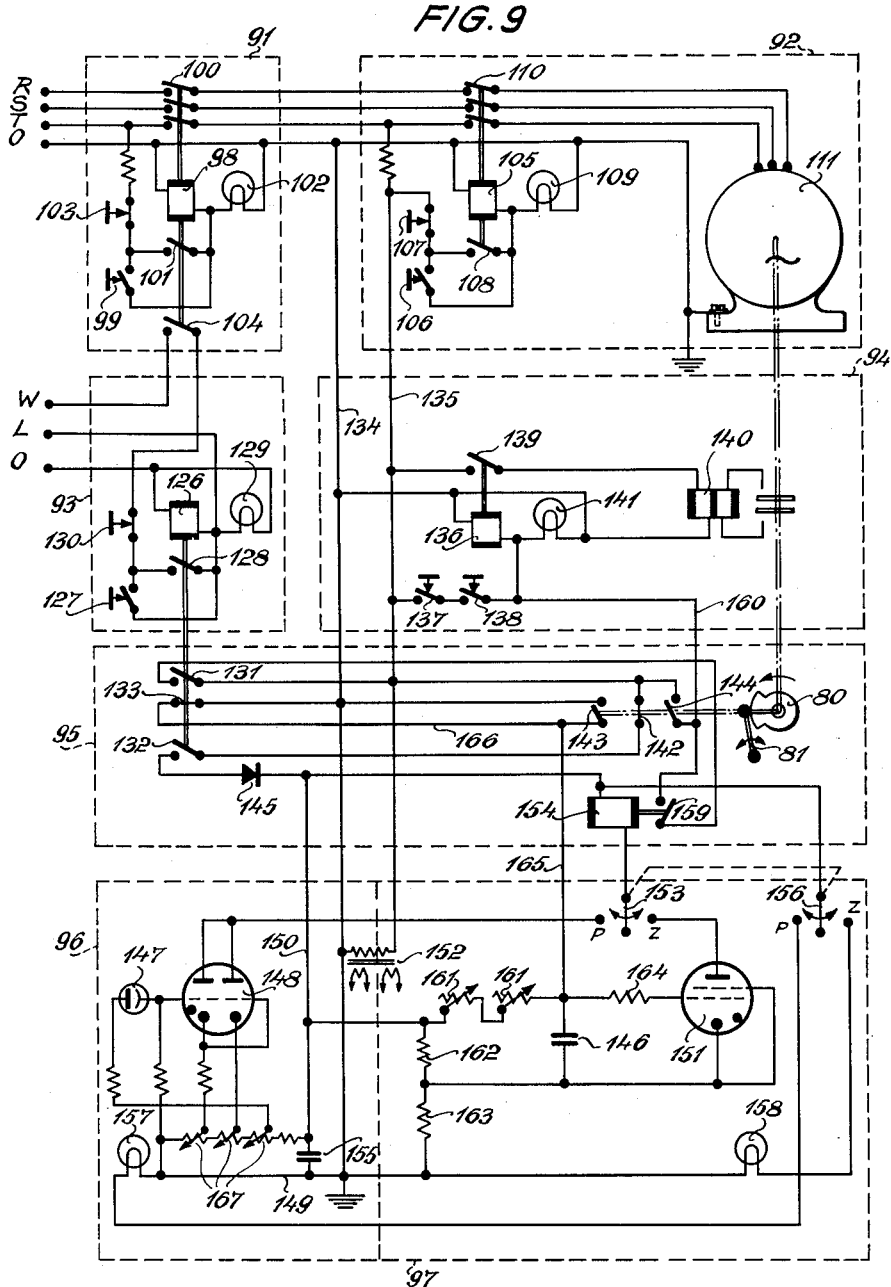

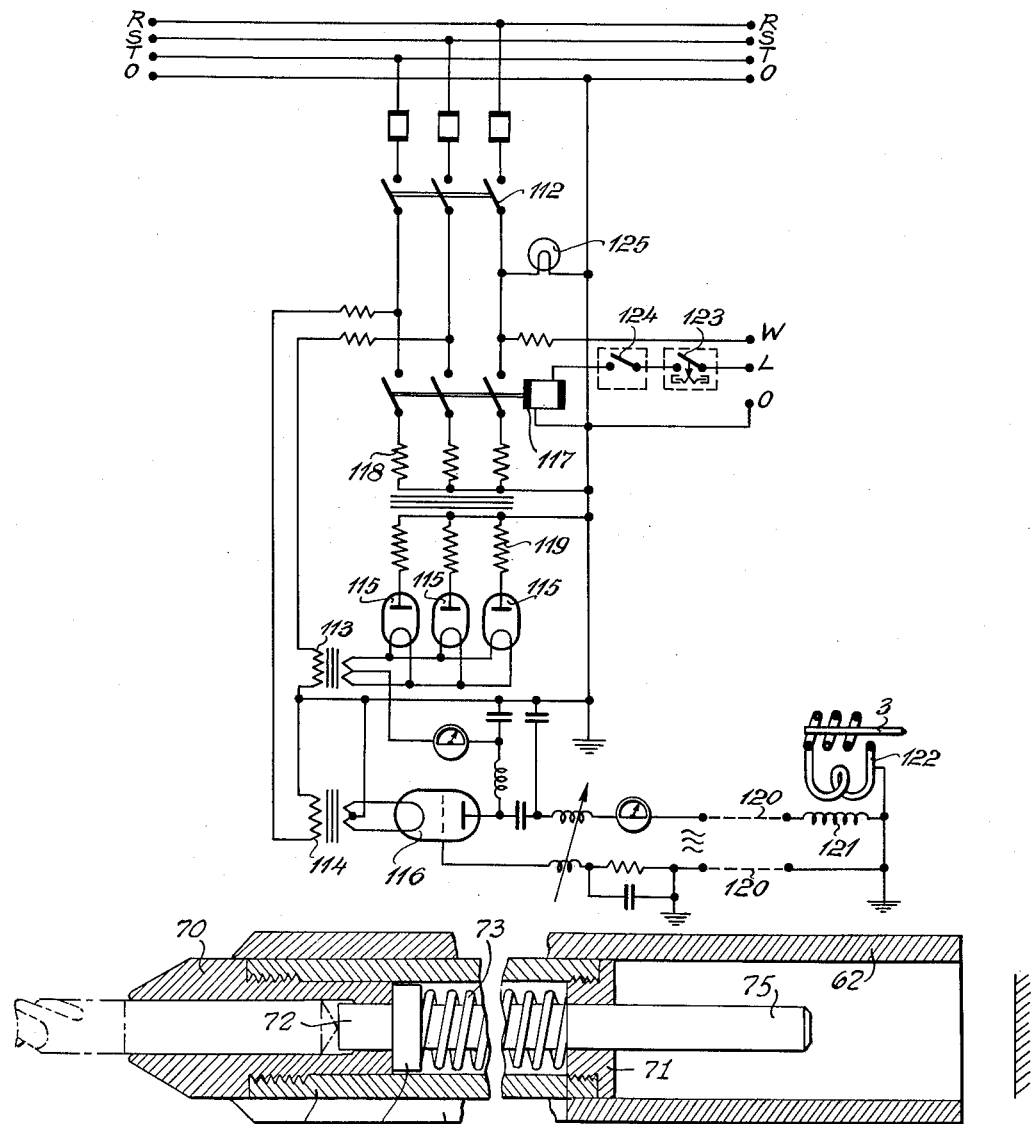

United States Patent Office 3,031,553
Patented Apr. 24, 1962

3,031,553
AUTOMATICALLY CONTROLLED ROLLING MILL FOR THE PRODUCTION OF CUTTING TOOLS WITH ROTARY WORKING MOVEMENT
Ferenc Erdélyi, 2850 E. 100th St., % Balsa,
Cleveland, Ohio
Filed May 22, 1957, Ser. No. 660,838
10 Claims. (Cl. 219—7.5)

The present invention relates to a fully automatically controlled rolling mill for the production of cutting tools with rotary working movement from round stock, which latter is fed directly into the bight of the rolling mill through a heating device.

The object of the invention is the provision of a foolproof rolling mill whereby a fully automatic working of the periodically occurring sequence of operations is ensured, while avoiding the danger that an insufficiently heated workpiece might be introduced into the bight of the rolling mill. Since in rolling mill arrangements of the abovementioned kind very high working speeds are achieved (for example in the case of 3 mm. helical drills the working time amounts to about ⅓ second) and, in addition, reductions of cross-section of about 60% are achieved, the introduction of an insufficiently heated working piece would lead to damage of the rolling mill or the feed device. A further object of the invention is so to interlock electrically the heating device, the feeding device and the drive for the set of rolls that no false switching or asynchronism can occur.

A principal feature of the present invention consists in the fact that a clutch coupling is inserted between a constantly rotating driving motor and the driving arrangements which are to operate in synchronism for driving the rolls and the feed device, which clutch coupling is engaged in dependence upon the period of heating and/or the temperature of the blank workpiece which temporarily is situated in the heating device, such engagement of the coupling lasting for the duration of a full working cycle. Preferably the clutch coupling is designed as a rotary wedge coupling or an electromagnetic coupling which is operated by a stationary electromagnetic pawl or a switch.

According to a further feature of the invention the electromagnet which operates the clutch coupling is arranged to be operated according to the position of a selector switch in dependence upon the response of a photo cell which is adapted to operate as an electronic pyrometer, the latter being adapted to respond to the heat radiation from the workpiece which at the time is in the heating device, or which is adapted to be operated by an adjustable timing circuit in a periodic manner.

Further features of the present invention will be apparent from the following more detailed description in conjunction with a drawing representing a constructional example of the invention, wherein:

FIG. 1 is a longitudinal section through a rolling mill for producing helical drills and comprising a feed device, a magazine, a heating device, a stand of oblique rolls and an ejecting device;

FIG. 2 is a further longitudinal section through FIG. 1 taken in a different plane in order to make clear the feeding device;

Figure 3:
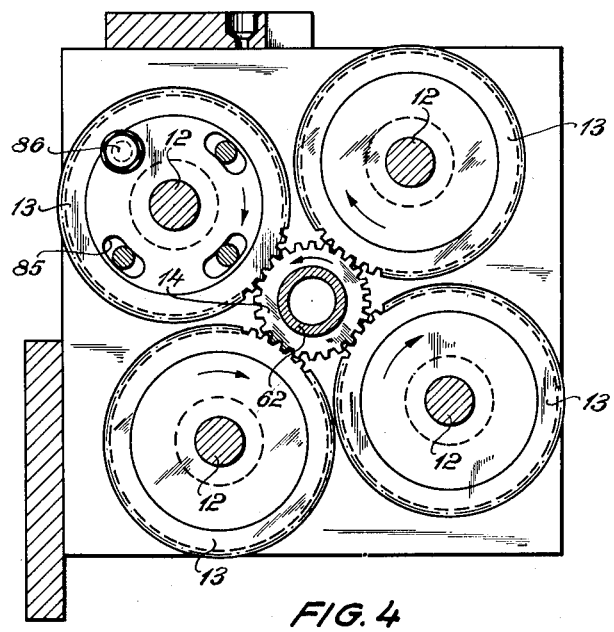
Figure 4:
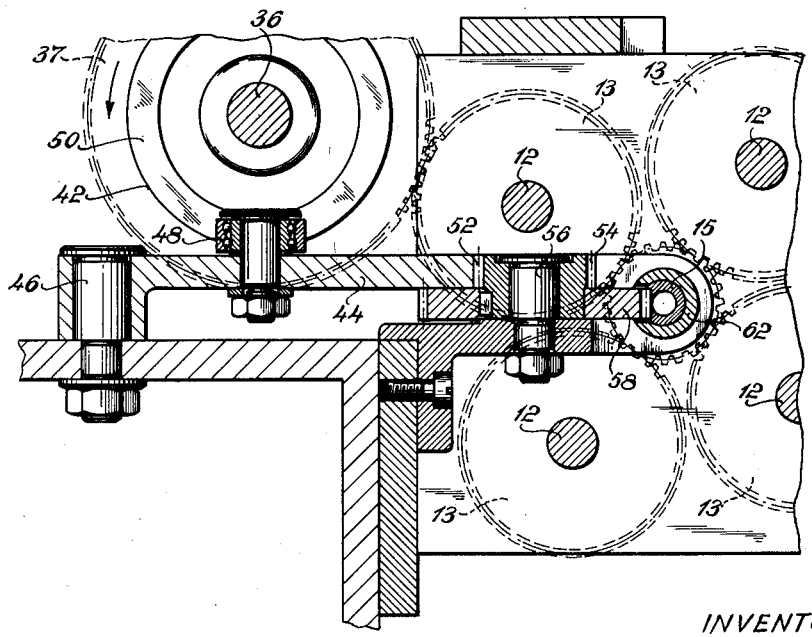
Figure 5:
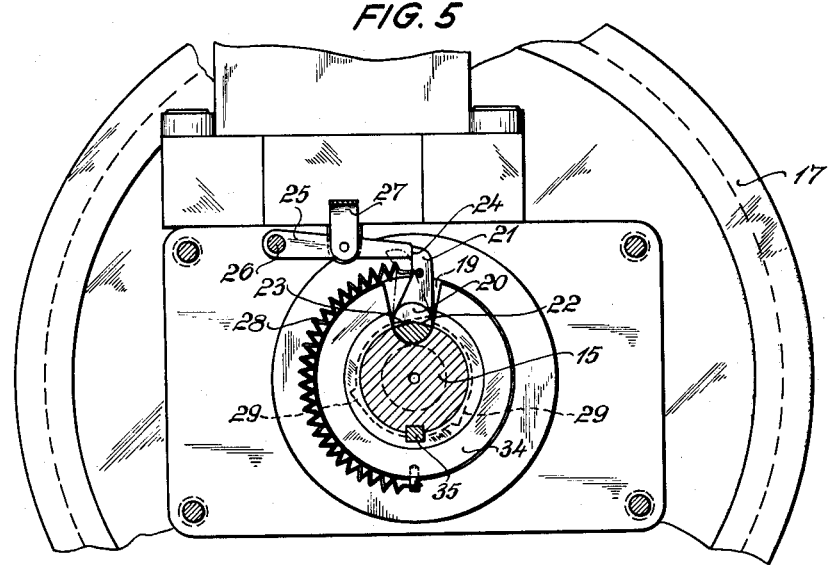
Figure 6:
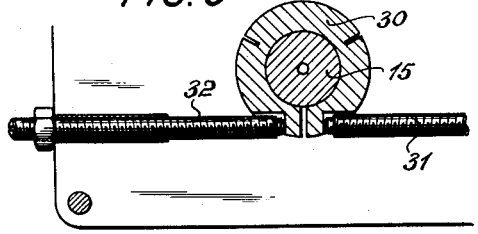
Figure 8:
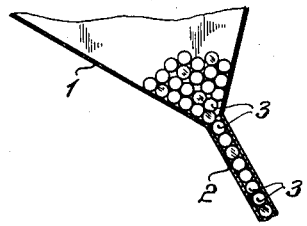
Figure 7:
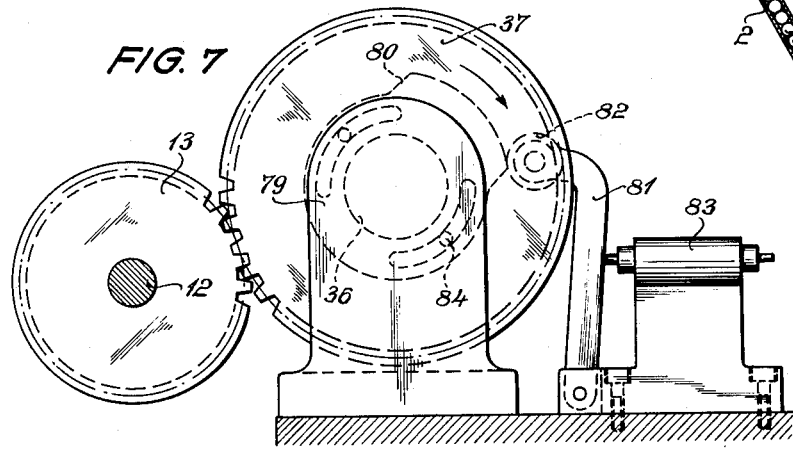

FIG. 3 is a section along the line III—III of FIG. 1;
FIG. 4 is a section along the line IV—IV of FIG. 1;
FIG. 5 is a section along the line V—V of FIG. 1;
FIG. 6 is a section along the line VI—VI of FIG. 1;
FIG. 7 is a section along the line VII—VII of FIG. 1;
FIG. 8 is a section along the line VIII—VIII of FIG 1;
FIG. 9 is an electrical circuit of the control means for the rolling mill;
FIG. 10 is an electrical circuit of the high frequency generator for the heating device, and FIG. 11 is a detail, enlarged, sectional view of the ejector device showing a drill in light lines prior to compression of the ejector spring.

The rolling mill shown in FIGS. 1 to 8 inclusive is fed by a feed device, which is to be described below, from a funnel-shaped magazine 1 having a supply channel 2 (FIG. 8) the stock being in the form of turned workpieces. The exit opening 4 of the magazine 1 is aligned axially with respect to a push rod 5 and on the other hand centrally with respect to the receiving aperture of a heating device 6, and with respect to the rolling device which directly follows said heating device, so that the cylindrical workpieces 3 can proceed without change of their axial direction from the push rod 5 out of the magazine 1 into the heating device 6 and the bight of the rolling mill. The rolling mill itself consists in the present case of four obliquely-arranged profile rolls 7 which are distributed symmetrically over the periphery of the cross-section to be rolled, so that a completely closed bight is formed and that all of the rolls operate in the same transverse plane of the workpiece. Naturally more or less than four rolls could be arranged concentrically with respect to the bight of the rolling mill according to the characteristics of the product of the process.

All of the forming rolls 7 are positively driven and receive their motion over the roll shaft 8 which is arranged in a bearing bush 9 which is fixed with respect to the machine frame. At its rear end the roll shaft 8 carries a bevel gear 10 which engages with a further bevel gear 11. The bevel gear 11 is keyed to a driving shaft 12, which at its other end is provided with a spur gear 13. In order to clarify the drawing, FIG. 1 shows only a single forming roll and the driving elements belonging thereto. It will be understood however that the other forming rolls are provided in a like manner with symmetrical driving arrangements. The four main driving shafts 12 which are provided in the present example extend parallel to the longitudinal axis of the rolling mill and carry their driving spur gears 13 all in the same plane so that a synchronous drive of all four shafts can be effected by a central spur gear 14 which engages with all four of the spur gears 13 carried by the respective shafts.

In the present description it has been assumed that the driving members 8–14 inclusive are arranged in stationary bearings. A generally similar arrangement could however be devised in which the main shafts 12 received a planetary rotary movement. In the latter arrangement the workpiece, which is to be helically rolled, will not need to be rotated about its longitudinal axis, but on the contrary it could be arranged that the forming rolls would receive a suitable translatory movement in a direction spirally around the workpiece. However, in the arrangement now being described in detail it has been assumed that the blanks which are to be worked in the rolling mill have only a relatively short length and it is therefore simpler to arrange the forming rolls to be fixed with respect to the axis of progression of the work and to impart to the workpieces a rotary movement about their longitudinal axes.

The centrally arranged driving spur gear 14 is keyed to a main driving shaft 15 which is carried in the machine frame by means of two self-aligning roller bearings 16.

The main driving shaft 15 is driven by a driving motor (not shown in FIG. 1) over a V-belt pulley 17. In order to provide a type of drive which makes it possible to rotate the main driving shaft exactly for the period of a full working cycle or multiple thereof, a rotary wedge coupling is provided between the V-belt drive 17 and the main driving shaft 15. The V-belt pulley 17 is arranged on a substantially cylindrical extension of the main driving shaft 15 and is carried upon two ball races 18, which in the decoupled condition of the coupling, provide a low frictional rotation of the V-belt pulley 17 with respect to the main driving shaft 15. As may be seen from FIG. 1 the driving extension of the main driving shaft 15 is wider than the corresponding hub section of the V-belt pulley 17. Within the region of the relatively slidable cylindrical surfaces between the shaft 15 and the V-belt pulley 17 there is provided an axial bore 19 in which is inserted the wedge key 20 of the coupling. Laterally adjacent the hub portion of the V-belt pulley 17 the driving key is of cylindrical cross-section and is at that point provided with a coupling arm 21. However, at its central portion on the other hand the driving key has the cross-section of a circular segment as may be seen more clearly from FIG. 5. The wedge surfaces 22 and 23 of the driving key are so dimensioned that in the position shown in FIG. 5 the V-belt pulley 17 can rotate freely upon the main driving shaft 15.

In the decoupled position in which the main driving shaft is stationary, the coupling arm 20 of the rotary wedge coupling bears against an abutment surface 24 on the end face or a rock lever 25. This rock lever 25 is pivoted by means of bolt 26 in the machine frame and can be rocked by means of a magnet, which is not shown in the drawing, and which operates upon a lug 27 arranged at the centre of the lever 25, so that the end surface of the rock lever 25 can be brought out of engagement with the coupling arm 21. This operation of the rock lever 25 corresponds to the engagement of the coupling. If the lever 25 is deflected by the magnet the coupling arm 21 is urged in the counter-clockwise direction under the influence of the arcuately tensioned spring 28. This motion is, however, only possible when the wedge surface 22 is situated in the vicinity of any one of the three wedge shaped cavities 29 in the cylindrical bore of the hub of the V-belt pulley 17. Consequently, if the V-belt pulley is rotating continuously, the latter will be automatically coupled with the driving shaft 15 if the rotary key 20 can spring into one of the cavities 29. In order to avoid any undue time delay between the operation of the lever 25 and the coupling operation, there are provided in the hub of the pulley 17 three wedge-shaped cavities 29. It will be understood however that a single wedge surface or more than three of such surfaces could be provided. When the rotary wedge coupling has been made, that is to say, if the abutment lever 25 has been turned out of the range of the coupling arm 21 then the V-belt pulley 17 and the main driving shaft 15 rotate together with the rotary wedge and the coupling arm 21. If now the coupling is again disengaged, that is to say, if the abutment lever 25 is swung back, the coupling arm now strikes against the end face of the lever 25 during its following rotation, so that the main shaft is again decoupled by the corresponding rotation of the wedge key and the main driving shaft then remains stationarry whilst the V-pulley 17 continues to rotate. It will be clear from this description that the rotation of the main driving shaft 15 always begins at a predetermined starting point and, upon lowering lever 25, the said shaft will make less one full rotation and then again comes to rest in the same position. For the purpose of simplifying the assembly that end of the driving shaft 15 which carries the coupling is formed in several parts and consists of two rings 33 and 34 which, by means of two small feather keys 35, are made fast with the driving shaft 15.

Instead of using a rotary wedge coupling other desired types of coupling, for example magnetic, hydraulic, pneumatic or friction couplings could be used.

In order to prevent overrun of the main driving shaft 15 after the decoupling operation resulting from the stored up kinetic energy of said shaft, a friction brake is arranged concentrically around the main driving shaft 15. This friction brake consists, as shown in FIG. 6, of a split ring collar 30 which by means of adjusting screws 31, 32 can be adjusted to a determined braking value.

The performance of the reciprocating movements of the feed device by the main driving shaft 15 is effected over a main control shaft 36 (FIG. 2). This main control shaft 36 extends substantially over the entire length of the rolling mill and runs axially parallel thereto. This control shaft 36, as shown in particular in FIG. 7, is driven by a spur gear 37 which engages with one of the driving spur gears 13. Since in the present arrangement for the gear wheels 13 and 14 and 11 and 10 respectively a gear ratio 3:1 is chosen between main driving shaft 15 and the profile rolls 7, the same transmission ratio is chosen between the main driving shaft 15 and the main control shaft 36. Accordingly, three complete revolutions of the main driving shaft 15 correspond to a full rotation of the rolls 7 and also of the control shaft 36. Since the control shaft 36 extends over a great length, it is supported at each end in bevel roller bearings 38 and 39 and is supported at its centre by means of a self-aligning ball bearing 40. This control shaft carries in the region of the injecting device, and in the region of the ejecting device respectively a cam disc 41 and 42. Pivoted levers 43 and 44 respectively are provided adjacent these cam discs 41 and 42 and the supporting pivot bolts 45 and 46 of these levers 43 and 44 are arranged normal to the direction of the control shaft. Axially parallel to the pivot bolts 45 and 46 there are arranged, upon the levers 43 and 44 respectively, follower rollers 47 and 48 located in the plane of the control shaft 36, and these follower rollers can run upon the curved tracks 49 and 50 respectively of the cam discs 41 and 42. The free ends of the suspended levers 43 and 44 are formed as gear segments 51 and 52 respectively and each of these engages with a spur pinion 53 and 54 respectively carried in bearings in the machine frame. Since the pivoted levers 43 and 44 have their rollers 47 and 48 in continuous contact with the curved tracks 49 and 50 of the cams, a rotation of the control shaft will bring about a reciprocation of the gear segments 51 and 52 and thereby an oscillating rotation of the shafts 55 and 56 upon which the gear wheels 53 and 54 are carried.

Co-axially to the spur gear wheels 53 and 54 there are arranged spur gear wheels 57 and 58 keyed to the same shaft, and these latter spur gears project through a suitable cavity 59 or 60 respectively in a tubular guide member 61 or 62, to engage with the injection device or the ejection device respectively.

In the tubular guide member 61 there is arranged a sleeve gear rack 63 longitudinally displaceable with respect to the guide member 61 and the said gear rack carries at its end which is directed towards the magazine 1 a concentrically arranged push member 5 (see also FIG. 1). This push member 5 preferably has a circular cross-section which is somewhat smaller than the cross-section of the cylindrical workpiece to be fed into the machine. In order to damp the feeding motion of the workpieces, the push member 5 is not connected rigidly to the sleeve gear rack 63, but is cushioned by inserting a spring 64. The spring 64 is located in a tubular threaded insert 65 which is screwed into the sleeve gear rack 63. In order to prevent the displacement of the push member 5 from its mounting, the said push member is provided with a ring yoke 66 which at one end abuts against an end of the spring and whose outward movement is limited by a threaded nipple 67. The bore of the threaded insert 65 which receives the spring 64 is formed stepwise, so that the reversing stroke of the said push member is also limited by the impact of the ring yoke 66 upon the steplike contour of the bore. In addition to providing a smoother feed movement the spring 64 also fulfils the function of compensating any finishing tolerances of the blanks and back lash in the gears and also provides the possibility of using the same push member when treating various workpieces of differing dimensions.

As may be seen from FIG. 2 an adjustable abutment screw 68 may also be used to limit the swing stroke of the gear segment 51 in one direction.

The ejection device now to be described is in principle constructed in a similar manner to the injection device. The ejection device similarly comprises a tubular guide 62 in which is arranged a sleeve gear rack 69 in which engages the spur gear wheel 58. Within a central bore of the rack 69, whose diameter is slightly greater than the diameter of the workpiece, there are arranged an ejection rod 72 and a spring 73 by means of two screw nipples 70 and 71. The ejection rod 72 is supported with its ring yoke 74 against one end of the spring 73 and is pressed by said spring in the direction towards the bight of the rolling mill. In a similar manner as that already described for the injection device, this ring yoke limits the maximum possible longitudinal motion of the ejection rod 72.

The ejection rod 72 is so dimensioned that its end which is directed towards the rolling mill always remains in the sleeve gear track 69 or within the threaded nipple 70 which serves as a guiding piece. The rear end of the ejection rod 72 on the other hand projects somewhat beyond the rear end of the sleeve gear rack. The ejection device must fulfil in essence two functions. At the beginning of the rolling process the forward end (in the present case and in general the shank end) of the drill lies against the end surface of the resilient ejector, and this is because the sleeve gear rack moves backwardly with a somewhat slower speed than corresponds to the forward speed of the workpiece in the gap of the rolling mill. In this manner the blank workpiece which is situated in the gap of the rolling mill receives an addition stability from the increasingly stressed spring 73 which presses the ejector against the end face of the workpiece and thereby centres the latter. After the drill has completely left the gap of the rolling mill, the sleeve gear rack 69 is drawn back to such an extent that the rear end 75 of the ejector rod presses against the abutment 76. The abutment 76 is formed in the present case by the end face of the main driving shaft 15. Due to the pressure established thereby on the finished workpiece the latter is then laterally diverted and is thrown out through the slotlike ejector opening 77 of the tubular guide member 62. If necessary the ejection process can be still further improved by providing an additional deflection surface, for instance by bevelling or turning a conical surface on one edge of the workpiece and on the contacting end of the ejection rod.

In order to limit the forward stroke of the sleeve rack 69 an adjustable abutment screw 78 is provided for the gear segment in like manner as for the ejection device.

The cam discs 41 and 42 arranged on the control shaft 36 have their track surfaces 49 and 50 mutually adjusted in such a manner that the swinging movement of the sleeve racks 63 and 69 respectively take effect in such a manner that immediately one of the workpieces has left the bight of the rolling mill, the injection device immediately transfers the following workpiece to the rolling mill. Since as already described, three rotations of the main driving shaft 15 are necessary for each working stroke and consequently the rotary wedge coupling 20 can only be thrown out of engagement after making three revolutions, an additional cam disc 79 is keyed on to the control shaft, which for each working stroke performs only a single revolution, and this cam disc has a rise 80 (FIG. 7) which by means of a follower roller 82 and a rock lever 81 operates a magnetic switch 83. The magnetic switch 83 ensures that the magnetic coupling remains always engaged until a switching operation, corresponding to the position shown in FIG. 7, is produced, and it cannot therefore happen that the coupling is thrown out after for example ⅓ or ⅔ of a working stroke. In order to suit the adjustment of the control movement to the working stroke, the cam disc 79 is fitted upon the spur gear 37 by means of two arcuate slots. By this means and by using locking nuts it is possible to adjust and to fix the cam disc 79 in the desired position.

Since, preferably, the working profile of the rolling mill substantially corresponds to the length of the workpiece to be rolled, a still further adjustment is necessary in order to regulate the position of the rolls in relation to the main driving shaft. A coarse adjustment can be effected, for example, by mutually displacing the driving spur gears by one tooth division. In order to carry out a fine adjustment the arrangement shown in FIGS. 1 and 3 may be adopted in which the spur gears 13 are made in two parts, this being effected by providing the toothed crown of the wheel with arcuate slots 85 and fixing the toothed crowns to the hub portion 87 by means of bolts 86.

The mechanical operation of the rolling mill control is effected as follows:

First of all the driving motor is switched in so that the V-pulley 17 is in constant rotation. After a full magazine containing prepared blanks has been inserted in the machine, the heating device is then switched on, the latter consisting essentially of a high frequency transformer whose secondary winding cylindrically surrounds the feed path, and brings the workpiece to the rolling temperature by induction. In consequence of the described position of the rotary wedge coupling lever 21 with respect to the lever 25, all of the profile rolls 7 are situated in their initial position. If now the rotary wedge coupling is operated the injection device pushes the prepared workpiece out of the magazine 1 into the heating coil of the heating device wherein the workpiece attains the desired temperature in a very short time. During this working stroke and the subsequent reversal of the injection device 5 the profile rolls and the ejection device perform a full working stroke which latter, upon starting up the installation, is first of all an idle stroke. Without the influence of any additional control the rotary wedge coupling is subsequently thrown out in consequence of the contact position of the cam switch device 80–83, this occurring after three full revolutions.

The machine having been thus far prepared two separate control processes are then essential. For the purpose of the first control operation there is arranged a photo cell in the field of the heating device 6, and this photo cell operates as a pyrometer and when a sufficient degree of heat radiation is received from the workpiece, that is to say when the latter reaches the rolling temperature, the pyrometer operates the magnetic switch for the rotary wedge coupling this being effective for the performance of a full working cycle. In this manner provision can be made that, according to whether the heating up time is greater or smaller than the working cycle of the rolling mill, these latter are driven intermittently for single working cycles, or, alternatively, are continuously driven as the case may be, in which latter case the rotary wedge coupling remains permanently engaged in consequence of the photo cell control above described.

The second control facility employs as the controlling factor, not the heating temperature, but the heating period. If for example tests show that the heating process requires a certain period of time, a timing circuit is arranged which corresponding to this time period, periodically effects re-engagement of the coupling which has been disengaged by the end switch 83. The heating device 6 is so arranged with respect to the rolling mill that the next working piece to be rolled only has its rear end surrounded by the heating winding. Taking for example the case of a drill, this means that the shank end of the drill, which is the first part to be introduced into the rolling mill, is either not heated at all or only heated to a small extent while the other portions of the working piece are subjected to a substantial heating to the necessary temperature. Upon passage of the workpiece through the gap in the rolling mill, in the case where the workpiece is to be made into a twist drill, the latter is rotated about its long axis, in which case the obliquely-arranged forming rolls impart the necessary fluting to the workpiece. Since the forward end of the workpiece makes contact only with the tip of the corresponding end of the ejection rod 72, such free rotation of the workpiece is possible. In the manufacture of tools which are not provided with spiral fluting, for example a reamer, in which the forming rolls engage the workpiece not obliquely but at an angle of 90°, such positive rotation of the blank workpiece is omitted from the process. During the passage of the workpiece through the profiled rolls the sleeve rack of the ejection device moves slowly backward, and, in consequence of the above-mentioned difference in velocities between the rack and the ejection rod the spring 73 is stressed, and this stressing of the spring effects the ejection of the finished tool through the exit opening 77 after said workpiece has left the gap of the rolling mill and the rear end 75 of the ejection rod 72 has contacted the abutment 76.

The electrical circuit of the rolling mill installation which is described with reference to FIGURES 9 and 10 contains a multiplicity of circuit assemblies which are interconnected but with a view to easy interchangeabilty are arranged in separate unitary housings. These housings are indicated by a chain-like margin.

The above-mentioned switching assemblies are the main switch assembly 91, the motor circuit 92, the interlocking circuit 93 which is separately excited by the high frequency generator of the heating device, the switching circuit of the mechanical coupling 94, the cam actuated end switch 95 with its locking contacts, the photo-electrically operating timing device 96 acting as a pyrometer, the electronic pulse timing circuit 97 which co-operates with the timing circuit and the high frequency generator for the heating device shown in FIG. 10.

Preferably the switching units 91–97 are arranged in separate housings for the purpose of facilitating their connection by means of knife or plug contacts, so that in the case of a fault the faulty switching element can be extracted in the shortest possible time and replaced.

The supply electrical network is preferably a three-conductor alternating current network whose three phases are indicated by R, S and T and whose neutral line is indicated by O.

The main switch network 91 is positioned in front of all the circuits to be supplied so that in case of danger the entire installation may be switched out by means of the main switch 91. This main switch network contains relay 98 which by means of the single throw switch 99 is connected to the phase voltage and brings into circuit the three pole-switch 100. When operating the relay 98 the self-holding contact 101 is closed so that after quite a short contact time the single throw key 99 can again be released. A pilot lamp 102 serves for supervising the main switch circuit. In the excitation circuit of the relay 98 there is provided a circuit breaking key 103 by the operation of which the relay 98 is open circuited and the network is isolated. Furthermore the relay 98 is provided with a working contact 104 to which further reference will be made below and which serves for interlocking the high frequency generator.

The motor circuit 92 is arranged in a similar way to the main switch circuit 91 and contains an operating relay 105, a single throw key 106, an interrupting key 107, a self holding contact 108, a signal lamp 109 and a three pole switch 110. The input side of the switch 110 is directly connected with the output side of the three pole switch 100, so that the three phase motor 111 can only start when the main switch as well as the motor starting switch are operated.

The high frequency generator shown in FIG. 10 is also connected to the three phase network R, S, T. O and can be switched in by means of a three pole circuit breaker 112. When the three pole circuit breaker 112 is operated, energy is received over the phases S and T for the two series connected heating transformers 113 and 114 for three diodes 115, the triode 116 and over phase R for the signal lamp 125. In order to prevent any output from these supply lines from reaching the installation during the preliminary heating up of the high frequency heating generator, a triple pole protective circuit with a relay 117 is connected in series with the three pole circuit breaker 112 so that the power transformer 118, 119 can only be switched in when all the conditions for a proper operation have been fulfilled, that is to say, the main switch circuit must have been connected, a sufficient circulation of cooling water must have been provided and the heating filaments of the tubes 115 and 116 must have been heated up for sufficient time.

As may be seen from the drawing the output side of the three phase protective circuit with a relay 117 is connected with the star connected primary winding 118 of the power transformer while the secondary winding 119 of the transformer is also connected in star with three diode valves 115. The output of the transformer 119 is taken from the centre tap point of a heating transformer 113 and is then fed to an oscillatory circuit of known construction controlled by means of the triode 116. The output of the oscillatory circuit is taken over the conductors 120 to the primary winding 121 of the heating transformer. The heating inductor coil 122 coupled to the winding 121 forms the actual heating member through which the workpieces which are to be heated are fed in succession. The heating inductor coil 122 is traversed by cooling water in a known manner. The protective relay 117 is connected between the control line L and the neutral phase O through a membrane controlled switch 123 which is influenced by the pressure of the cooling water and through a delay switch 124. A further control line W serving for the separate excitation of the circuit 93 is taken off from the phase R between the isolating switch 112 and the protective relay 117.

The operation of the protective relay 117 is effected over the relay 126 which is connected in series between the neutral line O and the control line W with the operating contact 104 of the main switch 91 and the switching contact in key 127. If the switch 112 is closed and the switching in key 127 is depressed, the relay 126 receives current from the phase R of the high frequency generator and is locked on over the self holding contact 128 even after the key 127 has been released. The subsequent operation of the relay 126 is indicated by the parallel connected signal lamp 129. If the relay 126 receives current then the control line L is also connected to the phase R so that after closing of the contact 123 (showing that the cooling water circulation is in order) and closing of the contact 124 (showing that there has been a sufficient warming up time of the tubes 115 and 116) the protective circuit 117 is then effective and finally the blank workpiece 3 which lies within the heating inductor coil 122 is heated up. For switching out the relay 126 there is provided a break key 130 which interrupts the excitation circuit. The relay 126 also operates two working contacts 131 and 132 and a neutral contact 133.

The working contact 131 has the function of making inoperative the contact 159 of the coupling release relay 154 as long as the installation has not been switched into the fully operated condition. This contact 159 is to be referred to in more detail in the following. The working contact 132 switches off the D.C. supply for the entire system when the relay is not excited, this being the condition so long as the installation is not ready to operate. The neutral contact 133 of the relay 126 interrupts a switching line 166 over which a condenser 146, which is to be further referred to below, belonging to the timing circuit 97 is brought into the charged condition.

The operating circuit 94 which is provided for the coupling shown in FIG. 5, is provided with an energising voltage over the lines 134 and 135 after the main switching circuit has been put into operation. This assumes energisation of the relay 98. Between the lines 134 and 135 there are connected in series a relay 136 and two push button switching keys 137 and 138.

The series arrangement of the contacts 137 and 138 has the function of protecting the operators attending the machine from accidental faulty switching, because this double contact arrangement has increased safety factors. For example the relay 136 can only be switched in when both the push buttons 137 and 138 are simultaneously depressed. An unintentional faulty operation of the buttons 137 and 138 is essentially critical because the introduction of a cold working piece into the rolling mill can cause damage. In order to avoid this the keys 137 and 138 should be operable by a different method than that which is adopted for the keys 99, 103, 106, 107, 127 and 130. Upon excitation of relay 136 the operating contact 139 is attracted and thereby the electromagnet 140 which is connected to the lines 134, 135 is excited. The electromagnet 140 moves the rock lever 25 shown in FIG. 5 so that the rotary wedge coupling is engaged. A signal lamp 141 connected in parallel with the relay 136 gives a visible indication of the operation of the relay 136 and electromagnet 140.

The cam switch arrangement 95 with the cam disc 80 and the lever 81 serves for operation of the contacts 142, 143 and 144. In the end position of the cam switch 80, 81, the contact 142 connects the voltage carrying line 135 over the operating contact 132 of the excited relay 126 with a rectifier 145, which, on the one hand, provides the anode and grid voltages of the tubes of the timing circuits 96 and 97 and also provides the charging voltages for the condenser 146 which is to be further described below. In the coupled condition of the installation, the contact 144 bridges over the hand operated push buttons 137, 138 which are used normally for coupling in the installation. Contact 143 is required for the condenser 146 in order to provide for its charging and recharging during the operation of the timing circuit.

Photo electric timing circuit 96 contains a photo cell 147 which in dependence upon the heat radiation from the workpiece situated in the heating device controls the grid of a gas filled double triode 148. The initial and operating voltages of the photo cell 147 and the double triode 148 are taken off between the ground line 149 and the line 150 connected to the rectifier 145. The heating voltage for the double triode 148 and the pentode 151, to be referred to below, belonging to the other timing circuit are produced by a heating transformer 152 which is fed over the lines 134 and 135.

Since as already described the rolling mill can be controlled by a photo electric pyrometer or alterantively with a timing circuit 97, a changeover switch 153 is provided which in its position P switches over the anodes of the double triode 148 to the rectifier 145 and in its position Z connects the anode of the gas discharge pentode 151 over the relay 154 to the rectifier 145. Consequently in all cases only the timing circuit 96 or only the timing circuit 97 may be switched in since with either one of these systems the anode circuit is interrupted. The condenser 155 connected between ground and the line 150 serves for smoothing the anode and the grid D.C. voltage.

The switch 153 is also provided with a further contact arrangement 156 which, depending on the chosen switching position, illuminates the control lamp 157 (photo cell operation) or else the control lamp 158 (timing circuit operation) insofar as the contacts 132, 142 are closed.

If for example the switch 153 is placed in the position P then after the photocell 147 has registered a sufficient degree of heat and after the triodes have been energised a current flows through the anode which energises the relay 154. When relay 154 attracts its armature the operating contact 159 closes and phase T is connected over line 135, over the connected operating contact 131 (in the case of energisation of relay 126) and the line 160 of the relay 136, so that the clutching is achieved by electromagnet 140. The drive is now set in motion so that the cam disc rotates and closes the switching contact 144, so that the relay 136 remains so long in the attracted condition until a working cycle has been completed, that is to say the operating shaft has completed three revolutions. Thereupon switch arm 81 runs off from the cam and the relay 136 is de-energised and the drive to the rolling mill is declutched. The fresh workpiece which has now been brought beneath the photo cell 147 is now immediately subjected to heat radiation; nevertheless the response of the photo cell can only reactivate the tube 148 if the existing working stroke is at an end and the tube 148 receives current over contact 142. During the existing working stroke the D.C. voltage supply for the timing circuits is interrupted.

A further pulse time indication is given by the timing circuit arrangement 97 by means of the condenser 146 and the series connected regulating resistances 161. Between the ground connection 149 and the D.C. voltage line 150, there are connected two substantially equal series resistances 162 and 163, whereby the generated D.C. voltage is divided into two equal portions. The centre connection between these two resistances 162 and 163 is connected to one plate of the conducter 146 and to the cathode of a gas discharge pentode 151. The other plate of this condenser 146 is connected through the coarse and fine regulating resistances 161 to the positive voltage line 150 and also to the grid bias resistance 164 and further over a line 165 and the cam switch contact 143 to ground.

Upon the assumption that the selector switch 153, 156 is adjusted to the Z position, then as a consequence of the action of the cam switch 80, 81, after the engagement of the coupling by means of the relay 136 and electromagnet 140, the initially positively charged condenser 146 is connected through cam switch contact 143 to the ground connection line 149 which, in fact, has a negative potential due to the cathode of the pentode 151 being connected to the center of the voltage distributed by resistances 162 and 163. The negative potential then existing at the control grid of the tube 151 then blocks the anode current in that tube. When the existing working stroke of the machine has been ended the cam switch contact 143 reopens and at this point the condenser 146 can be positively charged from the positive voltage line 150 over the resistance 161. This recharging operation is dependent on the time constants of the charging circuit and the charging time can be changed by adjusting the value of the resistances 161. By this process, after the expiration of the predetermined time interval, there is established at one of the plates of the condenser 146 a sufficiently positive potential to fire the tube 151 and to operate the relays 154 and also the relays 136, 139 and electromagnet 140 for a further working cycle.

The electrical starting of the installation is effected as follows:

At first the operating key 99 is depressed. As a consequence the switch 100 is closed and the pilot lamp 102 is illuminated. Thereafter the switch 112 the high frequency generator is closed and the tubes belonging to these circuits are heated and at the same time the cooling water circulation of the high frequency generator is set in operation. The pilot lamp 125 is then illuminated and consecutively the operating key 106 is depressed and thereby the switch 110 is closed. At this point the pilot lamp 109 is illuminated and the motor 111 begins idle running.

After the expiration of a sufficient pre-heating time for the high frequency generator and after closing of the delay switch 124 the operating key 127 is depressed and the control line W which is supplied with voltage over the contact 104 is connected with the control line L so that the relays 117 and 126 respond and the power circuit of the high frequency generator is closed. Thereupon the pilot lamp 129 is illuminated and at the same time the contacts 131 and 132 are closed and the contact 133 opened.

At this point a hand operation of the two series connected push buttons 137 and 138 will effect the feeding of a blank workpiece through the heating device and into the rolling mill where it is reduced by rolling. Upon depressing the buttons 137 and 138 the pilot lamp 141 is illuminated and the electromagnet 140 is energised by the working contact 139 and thereby the coupling is engaged. By means of the cam switch 144, which bridges over the contacts 137 and 138, the electromagnet 140 remains excited until shortly before the end of the working stroke and decoupling only occurs after the cam disc has reopened the contact 144 through pivoting of the lever 81.

After the machine has been adjusted then a choice may be made by means of the switches 153 and 156 between photo cell operation (P) or time circuit operation (Z). The responsive sensitivity of the photo cell 147 can be adjusted by the aid of the regulating resistances 167 and that of the time circuit can be affected by the aid of the charging resistances 161. According to the position of the selector switches 153 and 156 the pilot lamps 157 or 158 respectively are illuminated in the decoupled condition. When operating with photo cell control the relay 154, and with it also the relay 139 and electromagnet 140 are switched in and the coupling itself is engaged only if the blank workpiece has been heated to a sufficiently high temperature by the preheating device. When operating the installation with the time circuit control 97 a discharge of condenser 146 is effected, after the end of a working stroke, over cam switch contact 143, and this discharge requires a time which has been determined by the values of the resistances 161 and thereafter this discharge has an influence on the grid of the pentode 151 and causes the relay 151 to attract whereby the coupling is made.

It is to be observed that the D.C. voltage supply to the pulse timing circuit is only connected when the cam disc 80 is in the position shown in which the drive to the rolling mill is decoupled.

Should there arise a fault in the high frequency heating device then the relay 126 is de-energised and releases. Since at this time the contacts 131, 132 and 133 are operated the pulse timing circuit 96, 97 cannot operate and therefore no further cold workpieces can be fed into the rolling mill.

What I claim is:

1. A fully automatically controlled rolling mill for the production of cutting tools having rotary working movement from a round stock, comprising high frequency induction heating means, a set of at least three positively driven forming rolls arranged directly behind said heating means, feeding means for axially feeding round stock material through said heating means directly into the bight of said forming rolls, a constantly rotating motor, a transmission driven by said motor for rotating said forming rolls and actuating said feeding means, said transmission including means for driving said forming rolls in synchronism with said feeding means, disconnectible coupling means between said motor and said transmission, operating means for said coupling means for operating said coupling means for the duration of a full working cycle and means for the control of said operating means by said heating means in dependence upon the duration of the heating period of said heating means.

2. A fully automatically controlled rolling mill for the production of cutting tools having rotary working movement from a round stock, comprising heating means, a set of at least three positively driven forming rolls arranged behind said heating means, feeding means for axially feeding round stock material through said heating means directly into the bight of said forming rolls, a constantly rotating motor, a transmission driven by said motor for rotating said forming rolls and actuating said feeding means, said transmission including means for driving said forming rolls being driven in synchronism with said feeding means, disconnectible coupling means between said motor and said transmission, and interlocking control means between said heating means and said coupling means operating said coupling means for the duration of a full working cycle in dependence upon the heating temperature attained by the round stock material situated in said heating means.

3. A fully automatically controlled rolling mill for the production of cutting tools having rotary working movement from a round stock, comprising high frequency induction heating means, a set of at least three positively driven forming rolls arranged directly behind said heating means, feeding means for feeding round stock material through said heating means directly into the bight of said forming rolls, a constantly rotating motor for driving a transmission for rotating said forming rolls and said feeding means, said transmission including means for driving said forming rolls in synchronism with said feeding means, a two-part rotary wedge coupling between said motor and said transmission, said rotary wedge coupling having a bolt with wedge surfaces, an operating arm secured to said bolt for oscillating said bolt between two positions, in one of said positions said rotary wedge allowing a free relative movement of said two parts of the coupling whilst in the other one of said two positions to lock the two parts of said coupling together, and means in dependence upon the heating temperature attained by the round stock material situated in said heating means for controlling the actuation of said coupling means.

4. In a rolling mill as in claim 3 wherein said operating arm of said rotary wedge coupling includes a radially directed stop portion and a pivotally mounted lever operatively selectively engageable with said stop portion.

5. In a rolling mill as in claim 3, a spring, said spring biasing said operating arm of said rotary wedge coupling in the direction coupling said two parts together.

6. A fully automatically controlled rolling mill for the production of relatively small diameter cutting tools having rotary working movement from a round stock, comprising high frequency induction heating means, a set of at least three positively driven forming rolls arranged directly behind said heating means, feeding means for axially feeding round stock material through said heating means directly into the bight of said forming rolls, a constantly rotating motor, a transmission driven by said motor for rotating said forming rolls and actuating said feeding means in synchronism, disconnectible coupling means between said motor and said transmission, electromagnetically operated control means for periodically operating said coupling means for the duration of a full working cycle, and interlock means between said control means and said heating means whereby the operation of said coupling means by said control means is in dependence upon the duration of the heating period.

7. A fully automatically controlled rolling mill for the production of cutting tools having rotary working movement from a round stock, comprising heating means, an actuating circuit for said heating means, a set of forming rolls arranged behind said heating means, feeding means for feeding round stock material through said heating means directly into the bight of said forming rolls, a constantly rotating motor, a transmission driven by said motor for rotating said forming rolls and actuating said feeding means, means synchronizing said forming rolls with said feeding means, disconnectible coupling means between said motor and said transmission, a photo cell operating as a pyrometer included in said actuating circuit of said heating means for sensing the temperature of the round stock during heating thereof and means actuated by said photo cell adapted to energize said coupling means for the duration of a full working cycle in dependence upon a predetermined degree of heat radiation from the heat round stock material situated in said heating means.

8. A fully automatically controlled rolling mill for the production of cutting tools having rotary working movement from a round stock, comprising heating means, a set of forming rolls arranged immediately behind said heating means, feeding means for axially feeding round stock material through said heating means directly into the bight of said forming rolls, a constantly rotating motor, a transmission driven by said motor for rotating said forming rolls and actuating said feeding means, means synchronizing said forming rolls with said feeding means, disconnectible coupling means between said motor and said transmission, an electrical timing circuit for operating said coupling means for the duration of a full working cycle in dependence upon the duration of said heating period and an operative connection between said circuit and said coupling.

9. The invention as claimed in claim 8 wherein the timing circuit comprises a resistance and a condenser combination whose time constant can be adjusted by varying the resistance.

10. A fully automatically controlled rolling mill for the production of cutting tools having rotary working movement from a round stock, comprising high frequency induction heating means, a set of forming rolls arranged behind said heating means, feeding means for feeding round stock material through said heating means directly into the bight of said forming rolls, a constantly rotating motor, a transmission driven by said motor for rotating said forming rolls and actuating said feeding means, means synchronizing said forming rolls with said feeding means, disconnectible coupling means between said motor and said transmission, electromagnetically operated control means for periodically operating said coupling means for the duration of a full working cycle in dependence upon the duration of the heating period, said control means comprising an automatic pulse time indicator, an electrical interlock between said indicator and said heating means permitting coupling of the rolls of the rolling mill with said motor only when said heating means is in operation.

References Cited in the file of this patent

UNITED STATES PATENTS

| | | |
|---|---|---|
| 181,010 | Prosser | Aug. 15, 1876 |
| 360,428 | Goddu | Apr. 5, 1887 |
| 582,471 | Hesse | May 11, 1897 |
| 690,088 | Warwick | Dec. 31, 1901 |
| 935,851 | La Plant | Oct. 5, 1909 |
| 1,448,371 | Baehr | Mar. 13, 1923 |
| 1,608,079 | Wurster | Nov. 23, 1926 |
| 1,961,256 | Spire | June 5, 1934 |
| 1,962,647 | Monroe | June 12, 1934 |
| 2,275,763 | Howard et al. | Mar. 10, 1942 |
| 2,329,188 | Denneen et al. | Sept. 14, 1943 |
| 2,376,654 | Braendel et al. | May 22, 1945 |
| 2,507,817 | Rapp et al. | May 16, 1950 |
| 2,519,164 | Watkins | Aug. 15, 1950 |
| 2,588,304 | Storm | Mar. 4, 1952 |
| 2,604,574 | Riddell | July 22, 1952 |
| 2,615,355 | Friedman | Oct. 28, 1952 |
| 2,620,690 | Preston | Dec. 9, 1952 |
| 2,730,916 | Gavurin | Jan. 17, 1956 |
| 2,737,834 | Coughlin | Mar. 13, 1956 |
| 2,790,530 | Stoltz | Apr. 30, 1957 |
| 2,856,498 | Jones | Oct. 14, 1958 |

FOREIGN PATENTS

| | | |
|---|---|---|
| 3,144 | Great Britain | Aug. 18, 1877 |
| 420,485 | Great Britain | Apr. 26, 1934 |
| 1,061,491 | France | Nov. 25, 1953 |
| 903,685 | Germany | Feb. 8, 1954 |
| 1,098,825 | France | Mar. 9, 1955 |
| 758,046 | Great Britain | Sept. 26, 1956 |